United States Patent [19]
Sewell et al.

[11] 3,971,941
[45] July 27, 1976

[54] QUANTUM COUNTER WITH TEMPORAL DISCRIMINATION

[75] Inventors: Kenneth G. Sewell, Dallas; James R. Herrington, Garland; William B. Volz, Richardson, all of Tex.

[73] Assignee: Varo, Inc., Garland, Tex.

[22] Filed: Feb. 12, 1975

[21] Appl. No.: 549,285

[52] U.S. Cl. .............................. 250/330; 250/458; 250/484
[51] Int. Cl.² ..................................... H01J 31/49
[58] Field of Search .......... 250/330, 332, 338, 340, 250/352, 361, 362, 363, 369, 458, 459, 472, 473, 483, 484

[56] References Cited
UNITED STATES PATENTS

| | | | |
|---|---|---|---|
| 3,070,698 | 12/1962 | Bloembergen | 250/459 |
| 3,675,039 | 7/1972 | Boyd et al. | 250/330 X |
| 3,764,807 | 10/1973 | Pollack | 250/330 |

Primary Examiner—Davis L. Willis
Attorney, Agent, or Firm—Olson, Trexler, Wolters, Bushnell & Fosse, Ltd.

[57] ABSTRACT

A radiation detecting system for direct viewing and imaging comprises a quantum mechanical substance that is arranged both to receive target radiation and to fluoresce for a predetermined lifetime. A source of pulsed pump radiation is coupled to the quantum mechanical substance, and the pump radiation is selected to possess a predetermined pulse duration less than the fluorescent lifetime of the quantum mechanical substance. A detector unit is optically coupled to the output of the quantum mechanical substance for readout purposes, and means are provided for selectively decoupling the detector and the quantum mechanical substance for the duration of a pulse of the pump radiation whereby to eliminate "noise" signals associated with the pump radiation.

7 Claims, 3 Drawing Figures

QUANTUM COUNTER WITH TEMPORAL DISCRIMINATION

BACKGROUND OF THE INVENTION

This invention relates generally to radiation detection systems and more particularly to such systems that are arranged for direct viewing and imaging and that incorporate an infrared quantum counter.

Quantum counters or converters that are responsive to infrared radiations have been known in the past, and one such system is disclosed in Bloembergen U.S. Pat. No. 3,070,698. Detecting systems based on such converters commonly include the salt of a selected rare earth element which is arranged to receive incident infrared radiations, the rare earth ion becoming excited from its ground state to a higher energy state in response. This excitation may subsequently decay by radiative or non-radiative energy transitions to a relatively long-lived metastable state. It is also known in the prior art to induce transitions from the metastable state to a still higher energy level by means of an auxiliary source of optical energy commonly referred to as pump radiation. The latter may be either continuously operating or pulsed. Radiative transitions from the higher energy level result in the emission of fluorescent signals at either visible or near-infrared wavelengths.

The described quantum counters have presented the potential for combination with detectors that are sensitive in the near-infrared and visible spectrums with resultant economies in fabrication and heightened sensitivity compared with systems incorporating detectors which are directly responsive to infrared radiation. Despite the apparent advantages, prior art detection systems incorporating infrared quantum counters have not been widely utilized because they have exhibited an undesirably high level of spurious signals or "noise."

Accordingly, an important object of the present invention is to provide a radiation detecting system which incorporates a quantum counter but which nevertheless exhibits high sensitivity and a high signal-to-noise ratio.

A more general object of the invention is to provide a new and improved radiation detecting system.

A more detailed object of the invention is to provide an infrared imaging system having no moving parts.

A further object of the invention is to provide means for temporally discriminating against spurious fluorescence produced within or external to a quantum mechanical substance by pump radiation.

These and other objects and features of the invention will become more apparent from a consideration of the following descriptions.

SUMMARY OF THE INVENTION

The present invention provides a system for converting infrared radiation into shorter, more readily detectable wavelength radiation while preserving the spatial information or image qualities of the target input. The system of the present invention significantly exhibits a high signal-to-noise ratio in the shorter wavelength radiation comprising the output of an infrared quantum counter; and the quantum mechanical substance of the counter comprises ions capable of absorbing infrared radiation and storing a portion of the absorbed energy for a finite time in a metastable state. The active ions in the quantum mechanical substance are further capable of being excited by a pulsed optical signal to an energy state higher than the metastable state, the active ions thereafter relaxing toward the ground state and emitting shorter wavelength radiations, i.e., fluorescing for a predetermined lifetime. A pulsed optical pump is selected to have a frequency output corresponding to the energy difference between the metastable state and the upper energy state, the pump radiations being further selected to have a pulse width or duration which is short compared to the fluorescent lifetime of the quantum mechanical substance. The system of the present invention additionally contemplates utilization of a gateable detector which is responsive to the wavelength of the fluorescent signal and which is capable of being altered from a non-operating mode to an operating mode in a time period that is short compared to the fluorescent lifetime of the quantum mechanical substance. Logic and control circuitry synchronizes the pulsed optical pump and the gate signal to the detector, and suitable imaging means and filters are included for their conventional purposes.

DETAILED DESCRIPTION OF THE ILLUSTRATED EMBODIMENT

Figure 1:
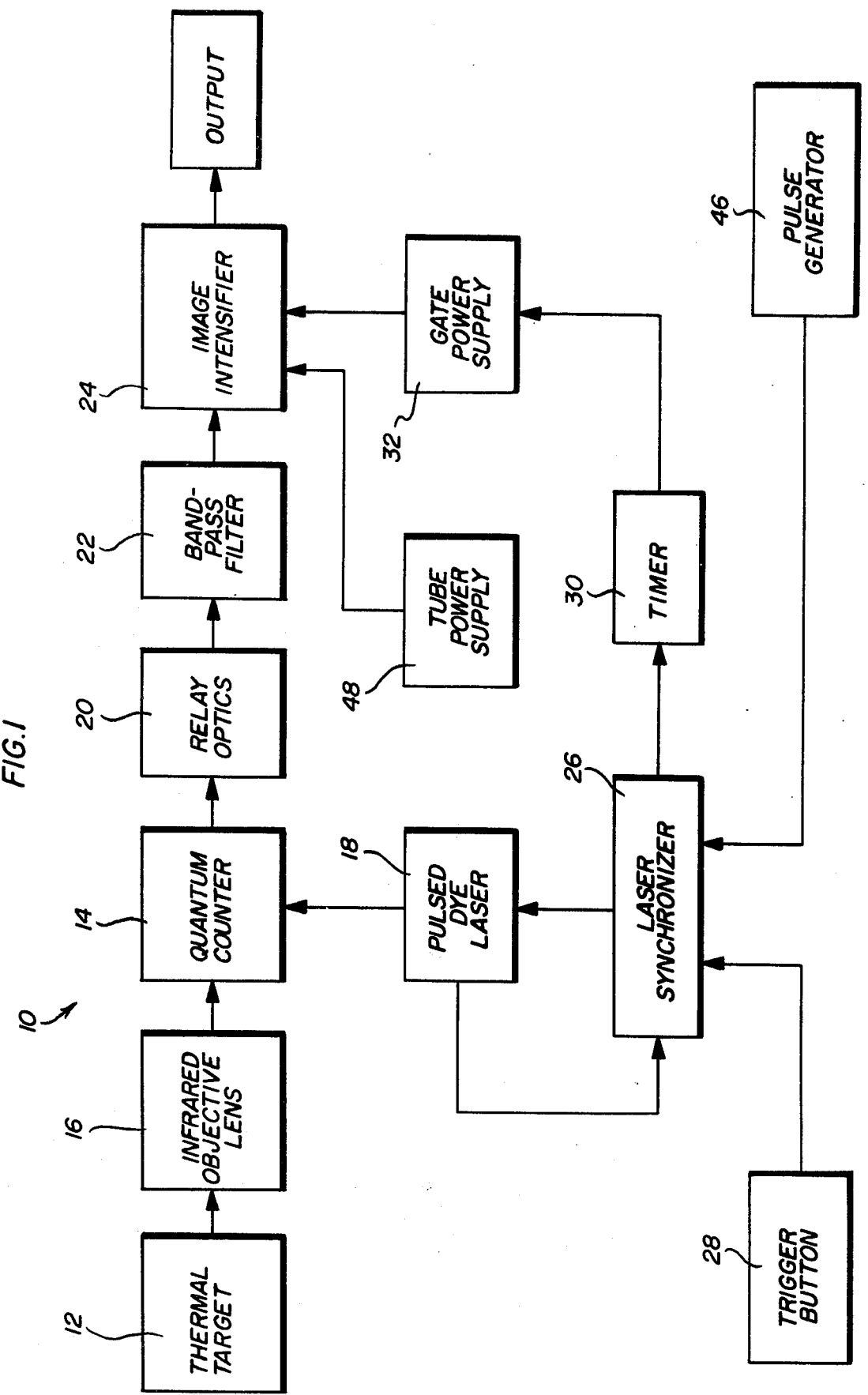
FIG. 1 is a schematic block diagram of a direct viewing and imaging system arranged in accordance with the present invention.

Referring now in detail to the drawings, specifically to FIG. 1, a radiation detecting system indicated generally by the reference numeral 10 is arranged for direct viewing and imaging of a thermal target 12 having a mean temperature of, for example, approximately 300°C. Infrared radiation at a wavelength of, for example, about 4.8 microns is collected from target 12 and focused onto a quantum counter 14 by an infrared objective lens system 16. The quantum counter 14 advantageously utilizes a quantum mechanical substance which preferably comprises praseodymium trichloride as the active material. In specific embodiments, the described quantum mechanical system has exhibited a quantum efficiency of about $6 \times 10^{-4}$ per watt/cm.$^2$ of optical pump power when operated at a temperature of 163°K. Furthermore, the fluorescent lifetime of praseodymium trichloride has been found to be on the order of 8.5 microseconds. Advantageously, the quantum counter 14 is maintained at a temperature of about 77°K.

In the illustrated embodiment, pump radiation for the quantum counter 14 is provided by a flash lamp excited, pulsed, dye laser 18 which is focused on the active material of quantum counter 14. The pump radiation overlaps the infrared target radiation and is absorbed. Suitable characteristics for the dye laser 18 are exhibited by the Model DL 1100 coaxial flash lamp pump dye laser manufactured by the Phase-R Company of New Durham, N.H., using Coumarin 6 in methanol for the dye. However, any pulsed optical source with the proper wavelength and pulse length may be used as a source of pump radiation for the quantum counter 14, the described dye laser being capable of delivering pump radiation at a wavelength of 546 nanometers with a pulse duration of approximately 300 nanoseconds.

Upon relaxation from its excited state, the active material of quantum counter 14 emits fluorescent radiations which are collected by suitable relay optics 20, filtered by a bandpass filter 22 and focused on the input optics of a three-stage, first generation, "gated", image intensifier tube 24, for ultimate display or readout as is desired. Advantageously, the bandpass filter 22 provides for selective passage of radiation having a wavelength of 645 ± 1 nanometers. The fluorescent emission from the active material of quantum counter 14 has been found to comprise a short-term emission occuring concurrent with the pulse duration of the dye laser 18, i.e., a lifetime of approximately 50 nanoseconds or less. The second component of the fluorescent output from quantum counter 14 comprises the normal fluorescent lifetime of the quantum mechanical substance, e.g. a lifetime on the order of 8.5 microseconds for praseodymium trichloride.

In compliance with the principles of the present invention, temporal discrimination is employed for substantially eliminating the influence of the above-described short-term emissions. These have been found to be spectrally broad without identifiable structure, linear with pump intensity and increasing in intensity with exposure of the quantum mechanical substance to atmosphere, thus characterizing them as "noise."

Figure 2:
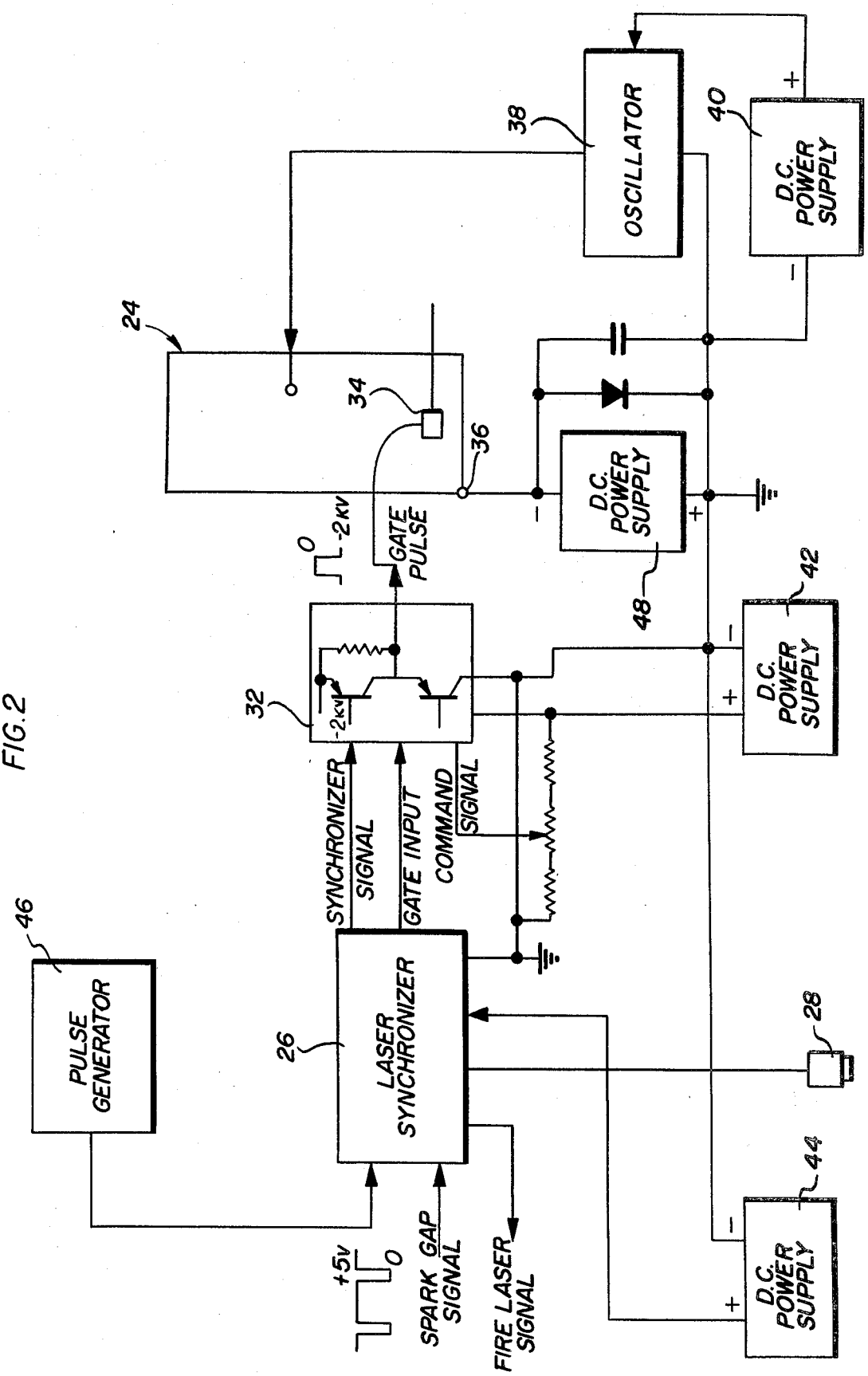
FIG. 2 is a schematic circuit diagram illustrating the means for temporal discrimination in the system of FIG. 1.
Figure 3:
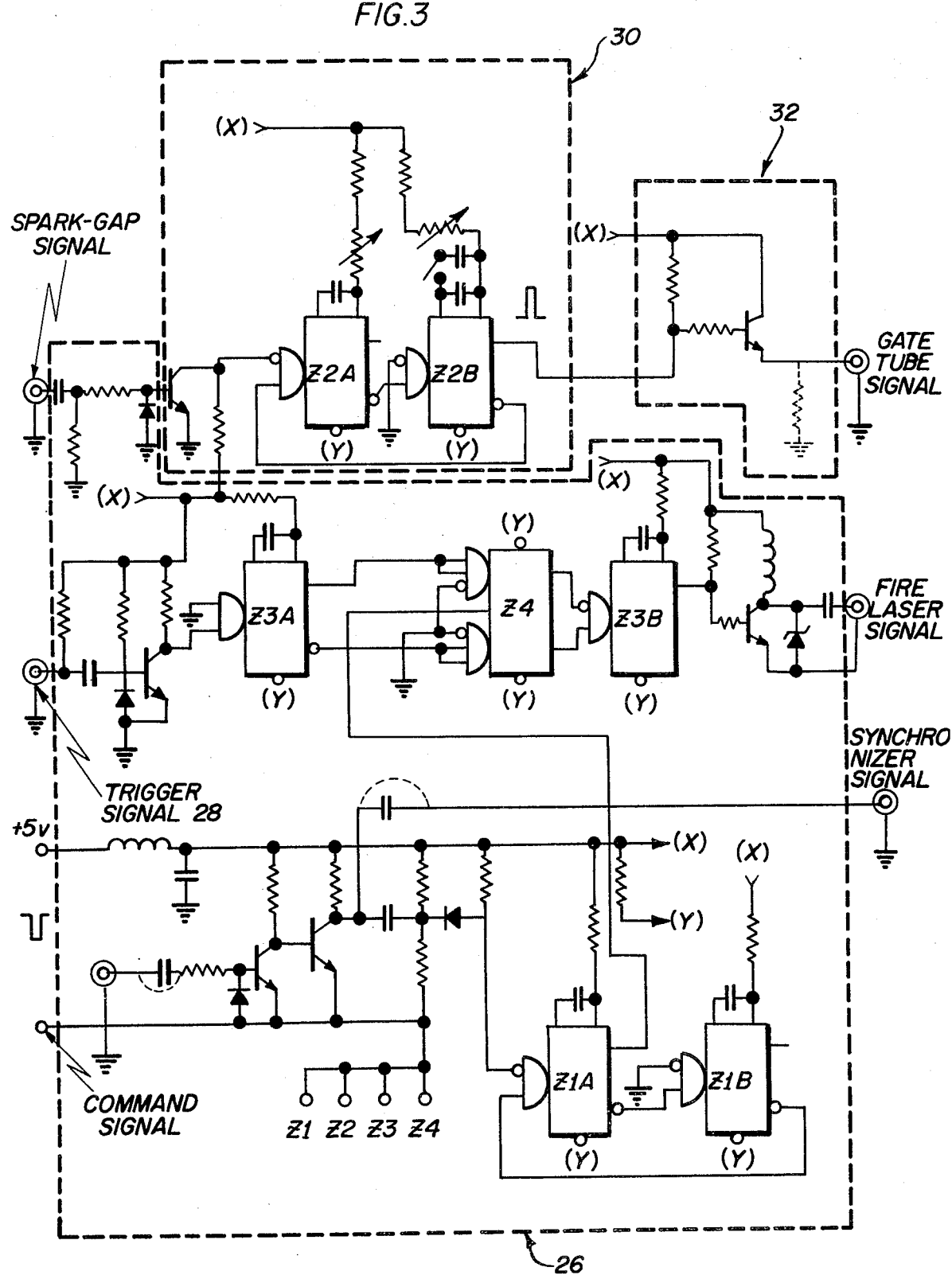
FIG. 3 is a detailed circuit diagram of the laser synchronizer and related output circuits used in the system of FIG. 1.

Continuing now with reference to FIG. 1 and with additional reference to FIGS. 2 and 3, the means for temporally discriminating against undesirable "noise" signals includes a laser by means of an operator manually depressing a trigger button 28. In response, the laser synchronizer 26 produces a "fire laser" signal which is connected directly to the dye laser 18 for activating that unit. Upon its firing, the laser 18 generates a "synchronizer" signal which is directed to the "spark-gap" input of the laser synchronizer 26. This "spark-gap" signal starts an integrated circuit timer 30 which, in turn, generates a "gate tube" signal after a preselected time delay between 0.5 and 1.5 microseconds. The gate tube signal is amplified and the result employed to switch a gate power supply 32 from −2,000 volts to ground. This gate tube signal pulse is applied to the focusing electrode 34 of image intensifier 24; and the −2,000 volt repulsive difference of potential between the focusing electrode and the photocathode 36, generated by the gate power supply when the image intensifier 24 is gated OFF, prevents photoelectrons from being accelerated toward the screen of the image intensifier. Contrariwise, the image intensifier is gated ON when the gate power supply 32 switches from −2,000 volts to ground, removing the repulsive difference of potential.

As will be seen with reference to FIG. 2, the alternating current input to image intensifier 24 is provided by means of an oscillator 38 in cooperation with a direct current power supply 40. Direct current energy is also provided by power supplies 42 and 44 in the manner shown; and the laser synchronizer 26 is advantageously provided with an input from a pulse generator 46. Finally, a direct current voltage is applied to photocathode 36 from a power source 48.

In one specific embodiment of the invention employing temporal discrimination to eliminate "noise," the minimum resolvable temperature difference was found to be on the order of 0.4°C. while contrast in the output image of approximately 40% was measured for a temperature difference of approximately 5°C. above ambient temperature.

The drawings and the foregoing descriptions are not intended to represent the only forms of the invention in regard to the details of its construction and manner of operation. For example, cooling means may be arranged with the quantum counter 14 and suitable packaging for that unit may be provided to isolate it from its environment. Furthermore, the means for temporal discrimination may be used in systems other than infrared detection. Other changes in form and in the characteristics of components, as well as the substitution of equivalents, are contemplated as circumstances may suggest or render expedient; and although specific terms have been employed, they are intended in a generic and descriptive sense only and not for the purposes of limitation, the scope of the invention being delineated in the following claims.

The invention is claimed as follows:

1. A direct viewing and imaging system comprising: a quantum mechanical substance arranged to receive target radiation and to fluoresce responsive thereto for developing an output with a predetermined lifetime; a source of pulsed pump radiation coupled to said quantum mechanical substance, said pump radiation having a predetermined pulse duration less than said lifetime; detector means optically coupled to the output of said quantum mechanical substance; and means for selectively decoupling said detector means and said quantum mechanical substance for the duration of a pulse of said pump radiation whereby to eliminate "noise" signals associated with said source.

2. A direct viewing and imaging system according to claim 1 wherein said quantum mechanical substance comprises praseodymium trichloride.

3. A direct viewing and imaging system according to claim 1 wherein said detector means includes image intensifier means having a gate and wherein said selective decoupling means includes circuit means for operating said gate.

4. A direct viewing and imaging system according to claim 3 wherein said circuit means normally operates said gate into a signal blocking mode for the duration of a pulse of pump radiation.

5. A direct viewing and imaging system according to claim 1 wherein said source is a pulsed dye laser.

6. A direct viewing and imaging system according to claim 5 wherein said dye laser has a pulse duration of about 300 nanoseconds and wherein said quantum mechanical substance has a fluorescent lifetime of about 8.5 microseconds.

7. A system for gathering information from incident electromagnetic radiation comprising: energy transfer means for converting incident electromagnetic radiation from a first wavelength to a second wavelength; which comprises an output source means for supplying conversion energy to said transfer means for a predetermined pulse duration; information collecting means arranged to receive the output of said transfer means; and temporal discrimination means operatively disposed between said transfer means and said information collecting means for selectively screening out spurious information.

\* \* \* \* \*

UNITED STATES PATENT AND TRADEMARK OFFICE
CERTIFICATE OF CORRECTION

PATENT NO. : 3,971,941
DATED : July 27, 1976
INVENTOR(S) : Kenneth G. Sewell, James R. Harrington and William B. Voltz It is certified that error appears in the above-identified patent and that said Letters Patent are hereby corrected as shown below:

Col. 3, line 33, after "laser" insert --synchronizer 26 which receives a trigger or initiation signal--

Signed and Sealed this

Twenty-sixth Day of October 1976

[SEAL]

Attest:

RUTH C. MASON
Attesting Officer

C. MARSHALL DANN
Commissioner of Patents and Trademarks